March 13, 1928.

C. M. GOODRICH 1,662,245

YIELDABLE CONNECTER FOR ELECTRIC CABLES

Filed June 14, 1927    2 Sheets-Sheet 1

Witnesses:
Edwin Trueb

Inventor:
CHAUNCEY MARSH GOODRICH,
by: D. Anthony Usina
his Attorney.

March 13, 1928. 1,662,245
C. M. GOODRICH
YIELDABLE CONNECTER FOR ELECTRIC CABLES
Filed June 14, 1927　　2 Sheets-Sheet 2
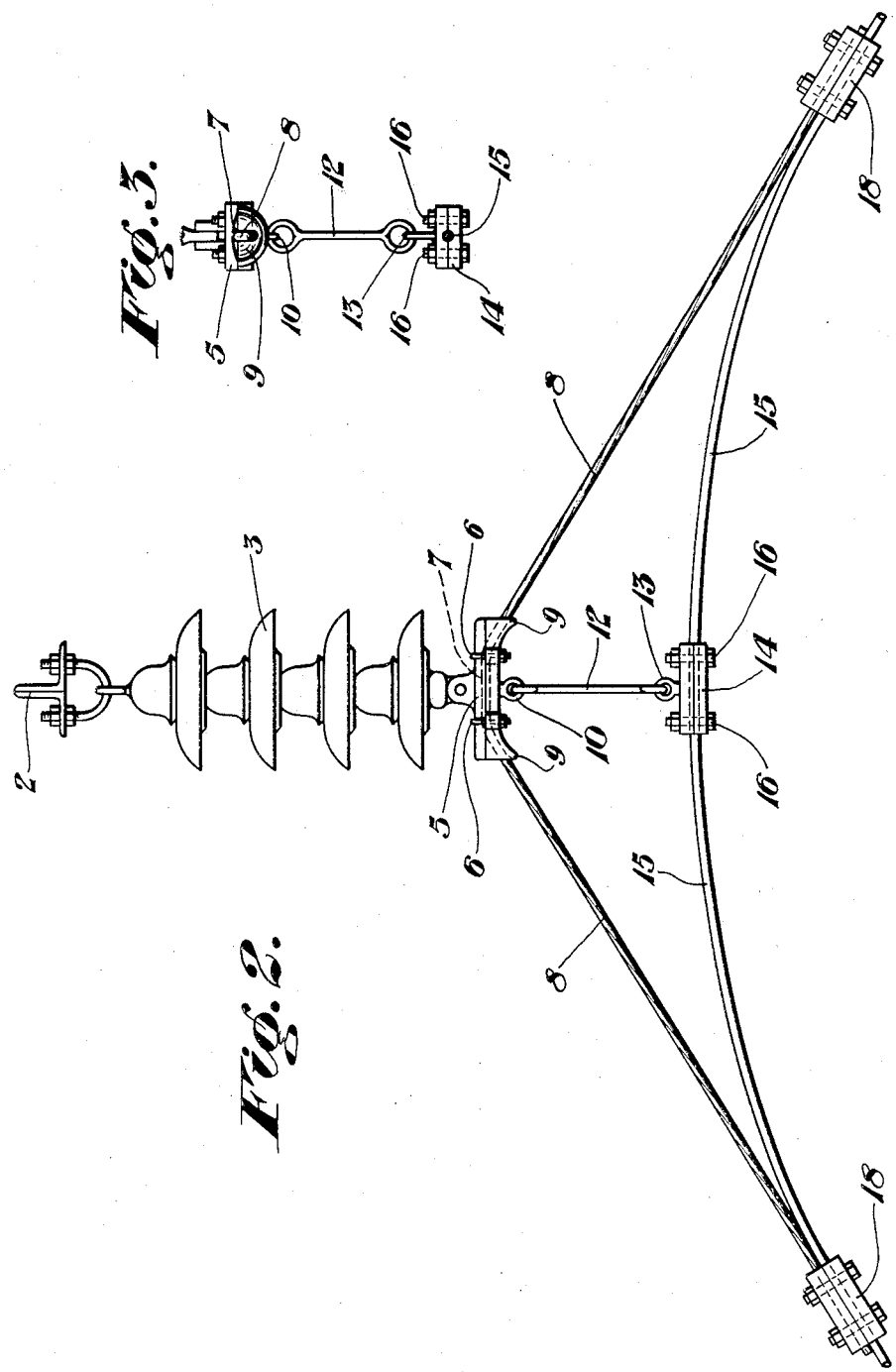
Witnesses:
Edwin Trueb
Inventor:
CHAUNCEY MARSH GOODRICH,
by:
his Attorney.

Patented Mar. 13, 1928.

1,662,245

UNITED STATES PATENT OFFICE.

CHAUNCEY MARSH GOODRICH, OF WINDSOR, ONTARIO, CANADA.

YIELDABLE CONNECTER FOR ELECTRIC CABLES.

Application filed June 14, 1927. Serial No. 198,845.

This invention relates to connecters for electric cables, and more particularly to yieldable connecters for suspending high tension electric cables from the arms of towers and other overhead supports, and has for its object the provision of a connecter which will carry the full loads across the line and differentials of load in the direction of the line, but which will allow the sag to increase and, therefore, carry greatly decreased stresses to the overhead supports or towers when a cable parts due to abnormal loads or the like.

In the drawings—

Figure 2 is an enlarged detail elevation showing a conductor supported in accordance with this invention.

Figure 3 is an end elevation of the lower part of Figure 2, showing details in the construction of the yieldable connecter suspended from the insulator string.

Figure 1:
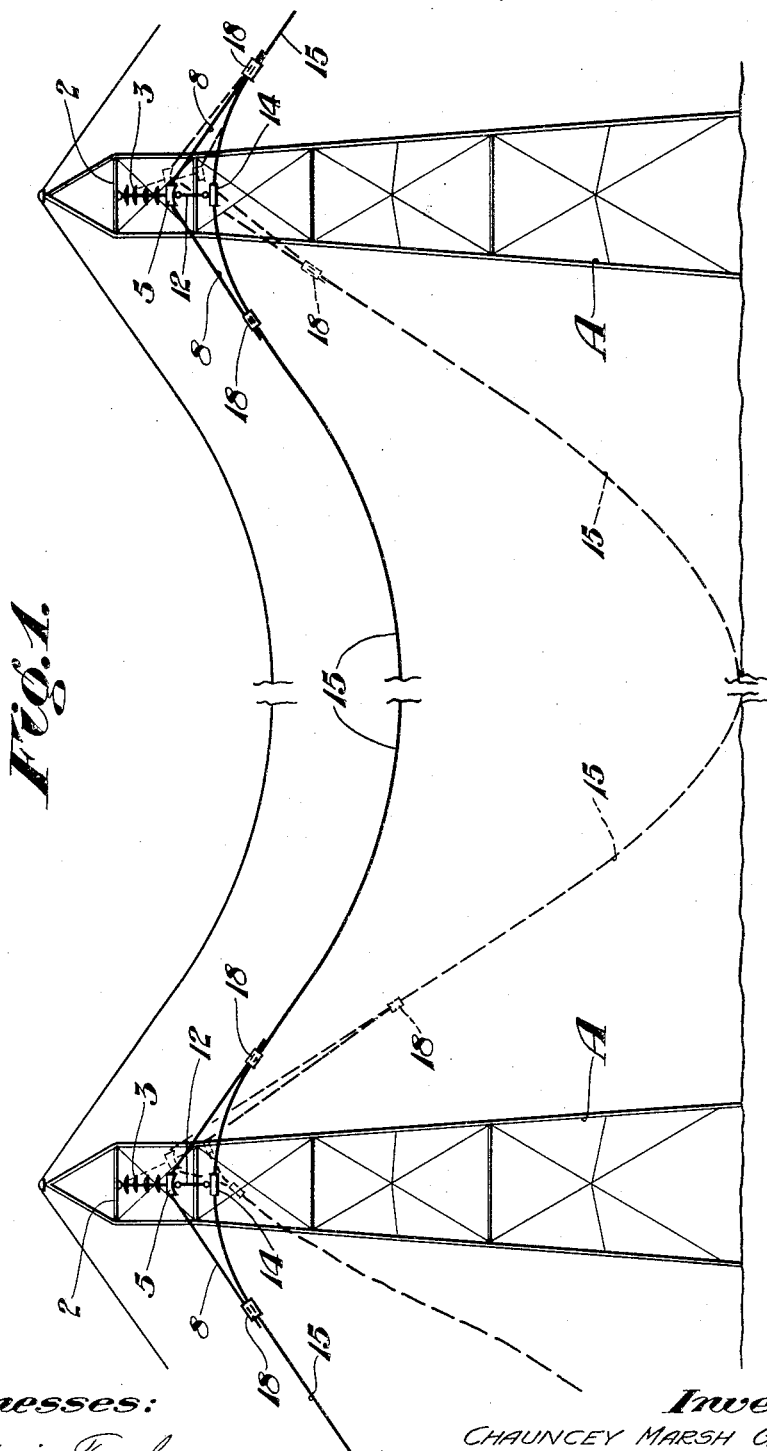
Figure 1 is a more or less diagrammatic elevation showing a line of towers having an electric cable supported thereon in accordance with this invention.

Referring more particularly to the drawings, the letter A designates the towers which may be of any standard design and have cross arms 2 from which the conductor cables are suspended.

The usual insulator strings 3 are flexibly suspended from the cross arms 2.

Heretofore the conductor cables have been fixedly clamped to the insulator strings, and when for any reason the cable parted between the points of suspension, the heavy abnormal stresses caused by the breaking of the cable would be transmitted directly to the towers through the insulator strings, therefore, necessitating the use of towers of sufficient weight and strength to withstand these abnormal stresses.

In the present invention a novel suspension means is provided which will relieve the towers of the abnormal loads caused by the parting of the conductor cables and, therefore, permitting the use of materially lighter towers than heretofore necessary.

In the present invention a two-part clamp member 5 is provided on the lower end of the insulator string 3. The upper part of the clamp 5 is secured to the insulator string in any desired manner, and the lower part of the clamp is secured to the upper part by U-bolts 6. The abutting faces of the clamp parts are grooved in the direction of the conductor cable and said grooves are in alinement with each other forming a passage or bore 7 to receive a suspension cable 8. The outer ends of the groove in the lower part of the clamp 5 are flared outwardly and downwardly, as at 9, to form a bearing surface for the suspension cable 8 and to also form a substantially bell-shaped mouth at each end of the bore 7.

The lower part of the clamp 5 is provided with an eye 10, and a suspension link 12 is pivotally secured to the eye 10 and has its lower end pivotally secured to an eye 13 on the upper part of a two-part conductor clamp 14.

The parts of the clamp 14 are fitted around the conductor cable 15 and are fixedly secured to the conductor cable by clamping bolts 16.

The link member 12 is of such strength that it will support the conductor cable under normal loads. However, this link is adapted to yield or break under abnormal loads such as are caused by the breaking of the conductor cable between its points of suspension.

In order to support the conductor cable when the link 12 is broken, a secondary suspension member in the form of the cable 8 is supported in the clamp 5 and has its ends fixedly secured to the conductor cable 15 at opposite sides of the insulator string 3 at points remote or materially beyond the insulator string 3 by clamps 18. The cable 8 has a less diameter than the diameter of the bore 7 in the clamp 5 so that said cable is free to move or slide through the clamp 5 in the direction of the conductor cable 15.

In operation, when the conductor cable 15 breaks between the points of suspension, an abnormal load will be immediately thrown on the suspension points at each side of the break. This abnormal load will cause the suspension links 12 at these suspension points to yield or break and, therefore, the loads will be thrown upon one end of the suspension cables 8 in the form of a pull, so as to cause the cables 8 to run through the clamps 5 in a direction parallel with the direction of the conductor until stopped by the clamps 18. This run of the cables 8 is sufficient when combined with swing of the insulator strings to permit the conductor cable either to sag onto the ground in the spans next to the broken span, or to sag sufficiently to reduce the stress on the cable to a predetermined lesser tension taken by the cable under maximum load conditions. Thus the stresses in an abnormal load that are caused by the breaking of the conductor will be eased off along the line and the towers will be undamaged.

With the conductor cables supported or suspended, as above described, it is possible to use very high pulls in the conductor cables without proportioning the towers for the pull of the cables when broken, as has been necessary heretofore.

While I have shown one specific embodiment of my invention, it will be understood that I do not wish to be limited thereto since various modifications may be made without departing from the scope of my invention as defined in the appended claims.

I claim—

1. A yieldable connecter for suspending electrical conductors from overhead supports, comprising an insulator string, a suspension member secured to a conductor and slidably supported on said insulator string for movement in a direction parallel with the direction of said conductor, and a second suspension member secured to said insulator string and said conductor and adapted to break under abnormal loads.

2. A yieldable connecter for suspending electrical conductors from overhead supports, comprising an insulator string, a suspension cable slidably supported on said insulator string for movement in a direction parallel with the direction of the conductor, said cable being clamped to said conductor on the opposite sides of said insulator string at points materially beyond said string, and a suspension link secured to said insulator string and said conductor and adapted to break under abnormal loads.

3. A yieldable connecter for suspending electrical conductors from overhead supports, comprising an insulator string, a suspension cable slidably supported on said insulator string for movement in a direction parallel with the direction of the conductor, said cable being clamped to said conductor on the opposite sides of said insulator string at points materially beyond said string, and a suspension link secured to said insulator string and said conductor and adapted to break under abnormal loads such as caused by the breaking of the conductor between its points of suspension, and said cable being of such length that it will move relative to the insulator string sufficiently to permit the next unbroken span of the conductor to have such increased sag as may be desired, in order to reduce the tension in the cable to a predetermined amount.

4. The combination with a high tension electric conductor, of a yieldable suspension means therefor comprising an insulator member, a suspension member secured to said conductor at opposite sides of said insulator member at points remote from said insulator member, said suspension member being slidably supported on said insulator for movement in a direction parallel with the direction of said conductor, and a suspension link secured to said insulator and said conductor and adapted to break under abnormal loads.

In testimony whereof, I have hereunto signed my name.

CHAUNCEY MARSH GOODRICH.